Sept. 22, 1942.  E. G. CROZIER  2,296,336

SPLICE FOR STRUCTURAL SHAPES

Filed July 18, 1939

Inventors:
EDWARD G. CROZIER, DECEASED
By: RHEA G. CROZIER, EXECUTRIX
and MONONGAHELA TRUST COMPANY, EXECUTOR
and RAYMOND P. PENNOYER.
by: John E Jackson
their Attorney.

Patented Sept. 22, 1942

2,296,336

UNITED STATES PATENT OFFICE 2,296,336

SPLICE FOR STRUCTURAL SHAPES

Edward G. Crozier, deceased, late of Munhall, Pa., by Rhea G. Crozier, Munhall, Pa., and Monongahela Trust Company, Homestead, Pa., executors, and Raymond P. Pennoyer, Pittsburgh, Pa.; said executors of Edward G. Crozier, deceased, assignors to Rhea G. Crozier, Marietta, Ohio Application July 18, 1939, Serial No. 285,222

1 Claim. (Cl. 61—53)

This invention relates to a splice for joining two rolled steel structural shapes end-to-end, and particularly structural shapes used as bearing piles.

An object of the present invention relates to the provision of a splice for bearing piles which can be made adjustable by expansion or contraction of the splice, so as to compensate for commercial tolerances developed in the manufacture of the structural shapes forming the bearing pile.

Another object of the present invention is to provide a splice capable of being expanded or contracted so as to bear tightly against the surfaces of the structural shapes being spliced without rupturing the metal.

Other objects and advantages will become apparent as the description proceeds and reference is had to the accompanying drawing, in which.

Figure 1:
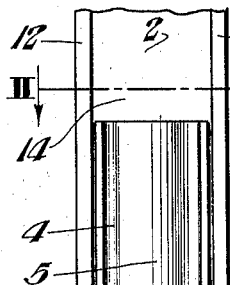
Figure 1 is a front elevation of the splice of the present invention applied to adjoining structural bearing pile members.

In the drawing, the numerals 2 and 3 represent conventional rolled steel H or I-beam structural shapes used as bearing pile sections. In the illustration in Figures 1 to 3, inclusive, the splice of the present invention comprises a unitary metallic member 4 formed by a rolling, pressing, forging or casting operation and includes a longitudinally extending centrally located corrugation 5 and arms 6 extending laterally in the same direction as the corrugation to form a substantially U or channel-shaped cross-section. One of these splice members 4 is positioned on each side of the structural bearing pile section and secured thereto in any conventional manner, such as, for example, by bolting, riveting, welding or any combination thereof.

It is the practice to first drive a shorter length bearing pile into the soil until the top is driven down to any convenient elevation. The splice is usually then secured to the top portion of such bearing pile, after which another bearing pile section is positioned in end-to-end relation with the lower bearing pile section, so that it likewise is encompassed or contacted by the splice, thus enabling driving operations to continue.

Under the prior conventional practice, difficulty has been experienced in that the splice intended for use on the particular installation does not always conform to the size of the structural members as measured in a transverse plane, due to variations commonly known as tolerances which are developed in the commercial manufacture of the structural shapes from which the pile sections are made. However, under the present invention, the bearing pile splice is of such a form and construction that it can be adjusted, within limits, by application of tension or pressure to the corrugation 5, so as to expand or contract the splice member 4 and thus compensate for the commercial variations or tolerances above mentioned. This pressure or force which is applied to the corrugation 5 will so condition the splice member 4 that all surfaces of the splice, so far as possible, will be brought to bear as tightly as necessary against all of the corresponding surfaces of the structural bearing pile sections to be spliced. After the pressure or force has been applied to the corrugation 5 of each splice member 4, the same will assume the position clearly shown in Figure 3, after which any conventional method of attaching the splice to the rolled steel bearing pile sections may be used.

Figure 4:
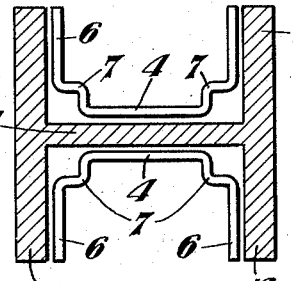
Figure 4 is a view similar to Figure 2, showing another form of construction for the splice members.
Figure 5:
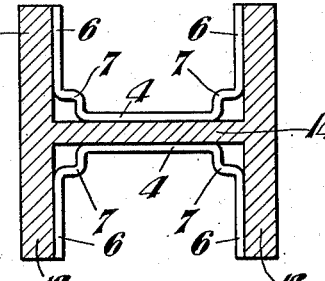
Figure 5 is a view similar to Figure 3, showing the splice member of Figure 4 expanded after force has been applied at the edge corrugations.

The splice member 4, which is positioned on each side of the structural shape, may be rolled, pressed, forged or cast, as shown in Figures 4 and 5. In this construction, the splice 4 is provided on each end with inwardly pressed corrugations 7 and includes a straight bottom portion interconnecting the corrugations, while the flanges 6 extend outwardly, as in Figure 2, to form a substantially U or channel-shaped cross-section. In this construction, the force or pressure is applied to either corrugation as may be desired, or, if necessary, to both of the corrugations, depending entirely upon the commercial tolerances present in the bearing pile section being used. After pressure is applied to the corrugation or both corrugations, as may be desired, the splice on each side of the surface of the commercial shape is expanded so that all surfaces of the splice, so far as possible, are brought to bear as tightly as necessary against all of the corresponding surfaces of the structural bearing pile sections to be spliced, as clearly indicated in Figure 5.

Figure 2:
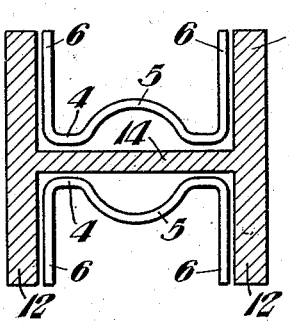
Figure 2 is a section on line II—II of Figure 1, showing the relative position of the splice members with respect to the structural shape prior to applying force or pressure for expanding the same into contact with the surfaces of the structural members.
Figure 3:
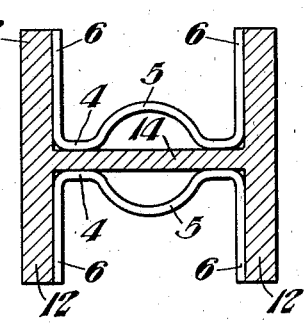
Figure 3 is a section similar to Figure 2, showing the splice members tightly engaging the surfaces of the structural bearing pile members after pressure has been exerted to expand the same.
Figure 6:
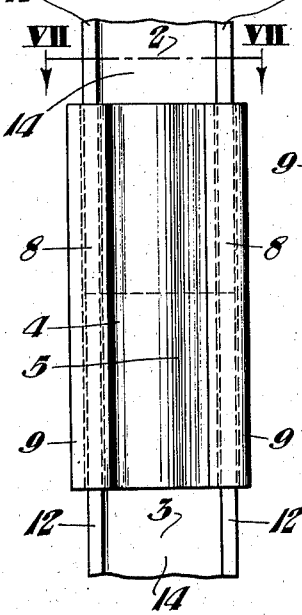
Figure 6 is a front elevation of another form of splice.
Figure 7:
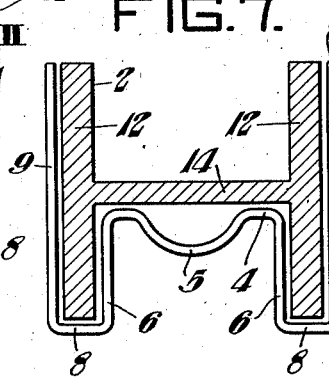
Figure 7 is a section on line VII—VII of Figure 6.

In the illustration in Figures 6 and 7, substantially the same construction is provided as in Figure 2, except that the flanges 6 are bent at right angles to provide a portion 8 adapted to contact the edge of the structural bearing section, and then bent rearwardly at 9 to provide a flange in spaced parallel relationship to the flanges 6, which flange 9 is adapted to contact a surface of the structural bearing pile section.

Figure 8:
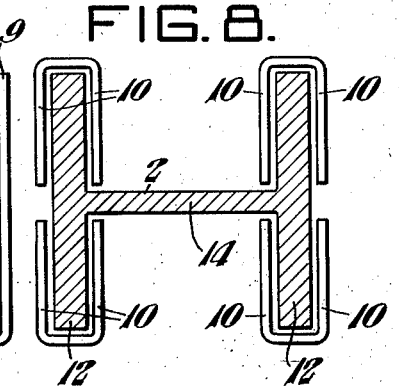
Figure 8 is a transverse section of a further form of splice construction in which pressure is applied to contract the splice members so as to tightly engage the surfaces of the structural sections.

In Figure 8, there is shown a modified form of the invention in which the splice comprises a rolled, pressed, forged or cast metal piece having a U or channel-shaped cross-section. In this form of the invention, one of these U or channel-shaped cross-sectional members is positioned over the edges of each flange of the bearing pile sections, and each splice member is adjustable to compensate for commercial tolerances by applying a force or pressure to the arms 10 in order to contract the splice member so that all surfaces, so far as possible, are brought to bear as tightly as necessary against all of the corresponding surfaces of the structural bearing pile sections to be spliced.

In this modification of Figure 8 the U-shaped splice members are positioned over edges of the flanges 12, and, by pressure being applied to the flanges 10 of the splice, the same are contracted to bear tightly against the inner and outer surfaces of said flanges 12.

In the present showings, the splice is illustrated as being applied to an H or I-shaped structural member. In the form of the invention shown in Figures 1 to 3, inclusive, the splice is positioned between the flanges 12 so that the flanges 6 of the splice members, which are positioned on each side of the web 14, may contact the inner surfaces of the flanges 12 of the H or I-beam member upon force being applied to the corrugation 5, so as to expand the splice member transversely for engaging the inner surfaces of the H or I-beam member.

In the showing in Figures 4 and 5, the flanges 6 of the splice member are expanded to contact the inner surfaces of the flanges 12 when force is applied to either one or both of the corrugations 7. In both cases, the splice is contained within the confines of the edge extremities of the flanges and between the web and the flanges.

It will be observed that, from the foregoing constructions, the splice of the present invention extends over more than one surface of the structural shape and that the splice is capable of being adjusted within limits by the application of pressure so that all surfaces of the splice, so far as possible, are brought to bear as tightly as necessary against all of the corresponding surfaces of the structural members forming the bearing pile sections. An important feature of the present invention resides in the fact that it is possible to use a single splice for various sizes of structural shapes used for piling sections within reasonable commercial tolerances, and that the magnitude of force or pressure applied, for expanding or contracting the splice members to tighly bear against all of the surfaces of the structural shapes, is insufficient to rupture the metal forming the splice.

A metallic splice which extends over more than one surface in one integral piece has considerable value, especially in the case of structural shapes in bearing piles. The advantages of having the splice adjustable in size affords an opportunity to overcome the commercial variations developed in the manufacture of structural shapes used for bearing pile structures.

Regardless of whether the pile is considered as a beam or a column, it is important, from the standpoint of maximum efficiency and utility, that the ends of the splice shall make firm contact during the driving so as to strengthen or reenforce the pile at the juncture of the two pieces. It is important that all surfaces of the splice must firmly contact the mating surfaces of the structural shapes forming component parts of the pile. Due to the unavoidable variations in the commercial product of structural shapes, it has heretofore been impossible to produce satisfactory metallic splices by use of rolls, dies or patterns which would properly seat or make contact with the surfaces on three or more faces of the stock forms of commercially produced structural shapes. However, under the present invention, there is provided a splice which can be adjusted to compensate for commercial variations without rupturing the metal forming the splice. In each instance, the bearing splice is attached in any conventional manner to the bearing pile sections by bolting, riveting, welding, or any other combination thereof.

While we have shown and described specific embodiments of the present invention, we do not wish to be limited exactly thereto, since various modifications may be made without departing from the scope of the invention, as defined by the following claim.

We claim:

A splice for connecting the abutting ends of superimposed rolled H or I-shaped bearing pile sections, comprising a pair of continuous metal splice members disposed vertically along the sections, each of the splice members having a pair of flanges extending vertically along the inner faces of the flanges of the sections and having connecting portions between the splice flanges extending vertically along the webs of the sections, each of said splice members having corrugations therein extending vertically thereof at the junctures of their flanges and connecting portions permitting selective transverse displacement of said flanges and connecting portions throughout the vertical length thereof into intimate contact with the said faces of the section flanges and the webs thereof upon the application of pressure to said corrugations, said members extending vertically across the juncture of the sections and being secured thereto whereby to provide rigid aligning and load-bearing connections with and between the sections.

RHEA G. CROZIER,
MONONGAHELA TRUST COMPANY,
By WILLIAM C. McCLURE,
*Trust Officer,*
*Executors of the Estate of Edward S. Crozier,*
*Deceased.*
RAYMOND P. PENNOYER.